(12) United States Patent
Veldkamp et al.

(10) Patent No.: US 8,360,723 B2
(45) Date of Patent: Jan. 29, 2013

(54) METHOD FOR REDUCING VIBRATIONS IN WIND TURBINES AND WIND TURBINE IMPLEMENTING SAID METHOD

(75) Inventors: Bart Veldkamp, Enschede (NL); Christoph Hessel, Meppen (DE); Jacob Nies, Zwelle (NL); Till Hoffmann, Osnabrück (DE)

(73) Assignee: General Electric Company, Schenectady, NY (US)

( * ) Notice: Subject to any disclaimer, the term of this patent is extended or adjusted under 35 U.S.C. 154(b) by 554 days.

(21) Appl. No.: 12/570,396

(22) Filed: Sep. 30, 2009

(65) Prior Publication Data
US 2011/0076142 A1 Mar. 31, 2011

(51) Int. Cl.
*F03D 7/04* (2006.01)
(52) U.S. Cl. .................. 416/9; 416/1; 416/155
(58) Field of Classification Search ........... 415/1, 19, 415/118; 416/1, 9, 12, 17, 37, 38, 61, 142, 416/153, 155
See application file for complete search history.

(56) References Cited

U.S. PATENT DOCUMENTS

| | | | | |
|---|---|---|---|---|
| 4,545,728 A | * | 10/1985 | Cheney, Jr. ........ | 416/11 |
| 6,441,507 B1 | | 8/2002 | Deering et al. | |
| 7,952,217 B2 | * | 5/2011 | Nielsen et al. ......... | 290/44 |
| 7,956,482 B2 | * | 6/2011 | Nies et al. ........... | 290/55 |
| 8,084,874 B2 | * | 12/2011 | Llorente Gonzalez et al. | 290/44 |
| 2006/0002793 A1 | | 1/2006 | Yoshida | |
| 2009/0169378 A1 | * | 7/2009 | Menke ............... | 416/1 |
| 2010/0295304 A1 | * | 11/2010 | Rowan et al. ......... | 290/44 |
| 2011/0280725 A1 | * | 11/2011 | Taylor et al. .......... | 416/1 |

FOREIGN PATENT DOCUMENTS

| | | | |
|---|---|---|---|
| DE | 19626402 | * | 7/1997 |
| EP | 1456535 B1 | | 9/2004 |

OTHER PUBLICATIONS

Siegfriedsen, Method of adjusting rotor blade of wind generator, Jul. 24, 1997, Abstract of DE19626402.*

Rogers et al., Wind Turbine Acoustic Noise, Jun. 2002, Renewable Energy Research Laboratory.*

* cited by examiner

*Primary Examiner* — Ninh H Nguyen
*Assistant Examiner* — Liam McDowell
(74) *Attorney, Agent, or Firm* — Global Patent Operation; Douglas D. Zhang (57) ABSTRACT

A method is presented that reduces vibrations of a wind turbine in a situation where yawing of a wind rotor of said wind turbine is at least temporarily not possible. The method includes adjusting a first pitch angle of a first rotor blade and a second pitch angle of a second rotor blade such that the first and second pitch angles differ by at least 30 degrees.

19 Claims, 7 Drawing Sheets

METHOD FOR REDUCING VIBRATIONS IN WIND TURBINES AND WIND TURBINE IMPLEMENTING SAID METHOD

BACKGROUND OF THE INVENTION

The present application relates to methods for reducing vibrations occurring in wind turbines. More particularly, the present application relates to methods for reducing the vibrations in wind turbines in situations where yawing of the wind turbine, i.e., rotating of a wind turbine nacelle about the tower axis, is not possible.

Wind power plants, also called wind farms or wind parks, include several wind turbines installed relatively close to each other in a defined area. One phenomenon known to occur in such wind farms is so-called vortex shedding. In particular, wind flowing around the tower of a wind turbine creates a von Karman vortex street downstream of the wind turbine tower. Under conditions favorable to the phenomenon, such as when a particular wind speed range or wind direction relative to the turbine and rotor position occurs, the turbine may start oscillating perpendicular to the wind direction. Such oscillations may then yield stresses in structural components of the wind turbine.

BRIEF DESCRIPTION OF THE INVENTION

In view of the above, a method is presented for reducing vibrations of a wind turbine in a situation where yawing of a wind rotor of said wind turbine is at least temporarily not possible. The method includes adjusting a first pitch angle of a first rotor blade and a second pitch angle of a second rotor blade such that the first and second pitch angles differ by at least 30 degrees.

According to another embodiment, a method for reducing vibrations of a wind turbine during yaw-incapability includes adjusting a first and a second rotor blade to different pitch angles, the pitch angles of the first and second rotor blades differing by at least 45 degrees.

According to a further embodiment, a wind turbine is provided. The wind turbine includes a first and a second rotor blade mounted to a rotor hub, each of the rotor blades being rotatable about a pitch axis for adjustment of its respective pitch angle, a pitch drive system adapted to adjust the pitch angles of each rotor blade, and a wind turbine controller adapted to control the pitch drive system to adjust, during a situation in which yawing of the wind turbine is at least temporarily not possible, a first pitch angle of the first rotor blade and a second pitch angle of the second rotor blade such that the first and second pitch angles differ by at least 30 degrees.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure include such modifications and variations.

Figure 1:
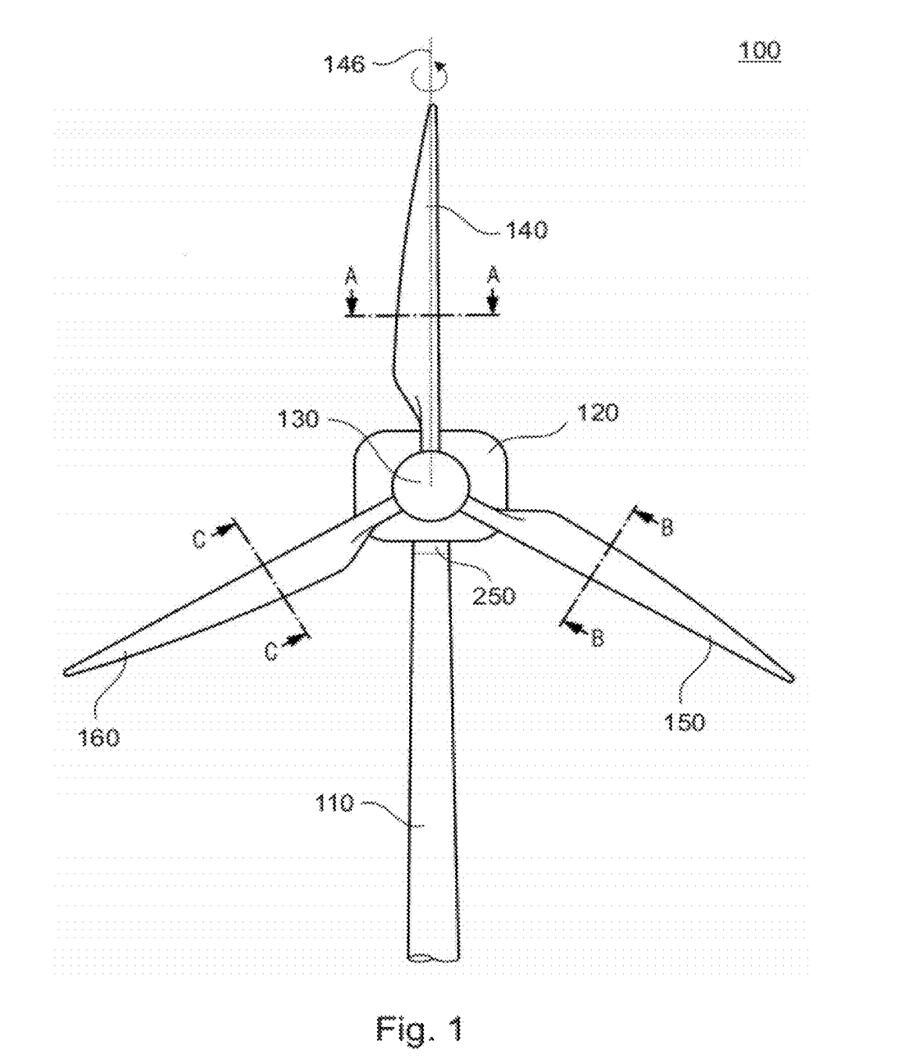
FIG. 1 is a schematic front view of a wind turbine.

FIG. 1 is a schematic front view of a wind turbine 100 having three rotor blades 140, 150, 160. However, the embodiments and examples described herein are not limited to wind turbines with three rotor blades but may be practiced also with wind turbines having a different number of rotor blades, in particular also only two rotor blades but also four or more rotor blades. The three rotor blades 140, 150 160 are arranged in a rotor blade plane around a rotor hub 130 which is attached to a nacelle 120 of the wind turbine. In this context, it should be understood that wind turbine rotors may have a cone shape so that the pitch axes of the rotor blades are not exactly aligned within a plane but rather form a flat cone. Such embodiments in which the axes of the blades are arranged on a cone rather than in a plane are nevertheless capable of practicing the embodiments described herein. Therefore, whenever reference to the rotor blade plane is made, cone-shaped embodiments are also embraced thereby. In both the plane and the cone-shaped embodiments, the angle between two adjacent rotor blades is typically equal and, in the specific embodiment shown, 120 degrees. Each of the rotor blades 140, 150, 160 is rotatable about its pitch axis (e.g., pitch axis 146 for rotor blade 140). The lines A-A, B-B, C-C denote top side views along the rotor blade axis shown in FIG. 2. The nacelle 120 is mounted on top of tower 110. Typically, nacelle 120 is rotatable about a vertical axis of tower 110 by means of a yaw drive 250. Thus, the wind rotor, i.e. rotor hub 130 and the rotor blades 140 mounted thereto, may be aligned with the wind direction so that the rotor blade plane is oriented substantially perpendicular to the wind direction. Typically, yaw drive 250 is energized by power supplied by a utility grid to which wind turbine 100 is connected. In the event of a grid loss, for example, yaw drive 250 has no sufficient power supply and, thus, is disabled to align the wind rotor with respect to the wind direction. Due to such misalignment, vortex shedding may occur as explained above.

Figure 2:
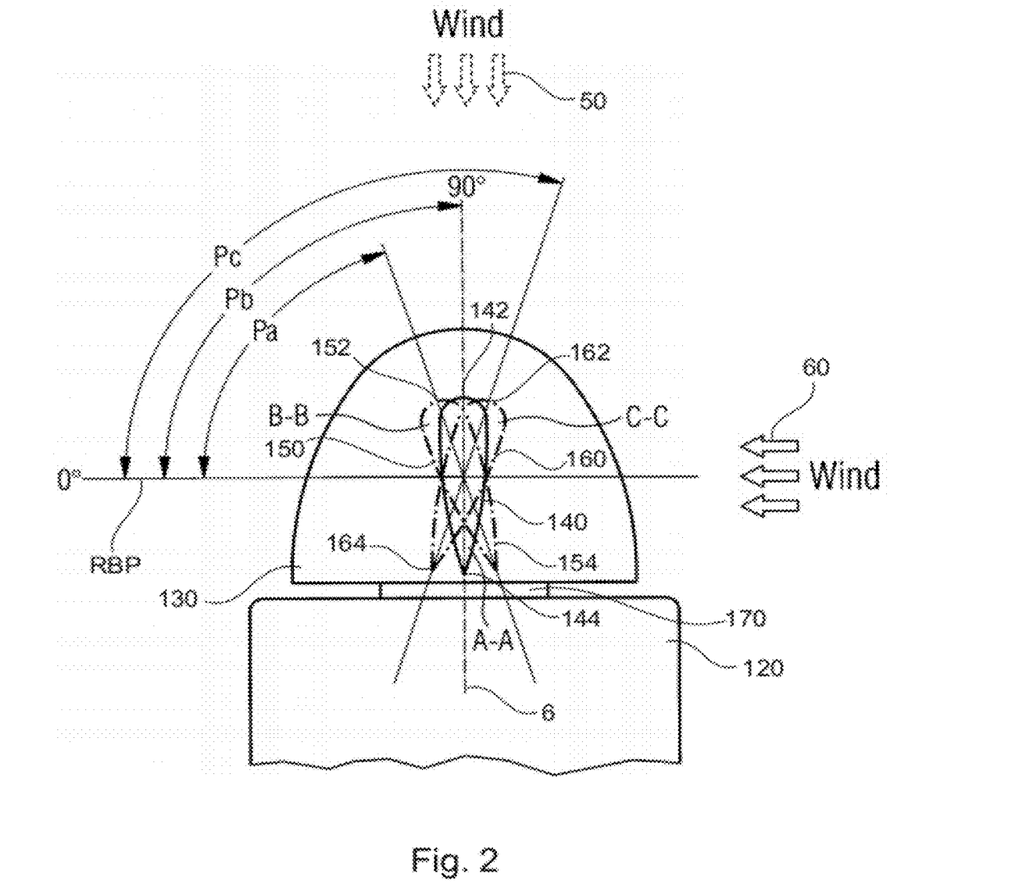
FIG. 2 is a superimposed top side view of the wind turbine shown in FIG. 1.

FIG. 2 is a superimposed top side view of the wind turbine shown in FIG. 1. Rotor axis 6 of the turbine extends substantially coaxially with rotor shaft 170 and substantially perpendicular to the rotor blade plane RBP in which the rotor blades are arranged. The rotor hub 130 is rotatably attached to nacelle 120. Side sectional views of all three rotor blades 140, 150 160 along lines A-A, B-B and C-C are superimposedly shown on top of rotor hub 130. It will be understood that each sectional view represents the moment at which the respective rotor blade has reached its top position.

Furthermore, the pitch angles Pa, Pb, Pc of the three rotor blades 140,150, and 160, respectively, are shown in FIG. 2. In normal operation of the wind turbine, the three pitch angles Pa, Pb, and Pc will be identical or differ from each other only by a few degrees. Pitch angles Pa, Pb, Pc are shown different for clarification purposes only. Each of the rotor blades 140, 150, 160 has a leading edge 142, 152, 162 and a trailing edge 144, 154, 164. For the purposes of the present disclosure, the pitch angle is defined as follows. A rotor blade position is defined to have a pitch angle of 0 degrees if the leading and trailing edges of the rotor blade are located within the rotor blade plane RBP (i.e., the leading edge facing left and the trailing edge facing right in FIG. 2). Rotating the blade clockwise from this position, where the leading edge is rotated toward the nose of rotor hub 130, a positive blade angle is gained with +90 degrees being the position Pa shown for sectional view A-A of blade 140. As shown in FIG. 2, the leading edge 142 and the trailing edge 144 are now aligned with rotor axis 6. The pitch angles Pb and Pc shown in FIG. 2 are also positive with Pb being smaller and Pc being larger than +90 degrees. The rotor blade has a pitch angle of +180 degrees (not shown) if its leading edge faces right and its trailing edge faces left in FIG. 2 along the rotor blade plane RBP. Pitch angles larger than +180 degrees will result in the leading edge facing toward the nacelle 120. If the rotor blade is rotated counterclockwise, i.e. the leading edge facing toward the nacelle 120, the pitch angle assumes negative values. For example −90 degrees pitch angle corresponds to a position where the trailing edge 144 faces toward the nose of rotor hub 130 and leading edge 142 faces toward nacelle 120. Accordingly, any pitch angle may be described by a positive and a negative value, for example +270 degrees being the same position as −90 degrees. This is shown as an example in FIG. 3 with respect to rotor blade 140. The positions of the rotor blades for other pitch angles can be obtained from the definitions given above.

Furthermore, the +90 degree pitch angle Pa shown in FIG. 2 for rotor blade 140 is also called the feathered position of the rotor blade. When in the feathered position, the rotor blade does not extract a substantial amount of energy from the wind and may even result in aerodynamical braking of the wind rotor. Therefore, the rotor blades 140, 150, 160 are usually brought into feathered position when the turbine is idling and no power is generated. However, the foregoing is only true as long as the wind direction is substantially perpendicular to rotor blade plane RBP as indicated by the broken arrows 50 in FIG. 2. In a situation where yawing of the wind turbine is at least temporarily not possible, e.g. due to grid loss, rotor blade plane RBP may be misaligned with respect to the wind direction as indicated by the full arrows 60 in FIG. 2. In the exemplary situation depicted in FIG. 2, rotor blade plane RBP is misaligned by 90 degrees with respect to the wind direction 60. In other words, instead of being perpendicular to the wind direction, rotor blade plane RBP is parallel to the wind direction 60. In this situation, vortex shedding is enhanced if all three rotor blades are in the feathered position. In particular, fore-aft oscillations or vibrations along rotor axis 6, are induced by vortex shedding. Also, vibrations in other spatial directions may be induced by the vortex shedding and may vary depending upon the misalignment between the rotor blade plane RBP and the wind direction. The same phenomenon may also occur if one or more of the rotor blades have a pitch angle of −90 degrees. Therefore, the aforementioned oscillations and vibrations may also occur during situations where the wind rotor is idling with the blades having a pitch angle of −90 degrees or with some blades having a pitch angle of +90 degrees and some having a pitch angle of −90 degrees.

In one embodiment of the present invention, a first pitch angle Pa of a first rotor blade 140 and a second pitch angle Pb of a second rotor blade 150 are adjusted such that the first and second pitch angles Pa, Pb differ by at least 30 degrees. For example, the first pitch angle Pa may be set to −90 degrees and the second pitch angle Pb may be set to +30 degrees. Due to the large difference between the first and second pitch angles, the effects caused by vortex shedding are considerably reduced. In particular, vibrations in the fore-aft direction of rotor hub 130 (in the direction or rotor axis 6) are dampened. Thus, the vibrational loads on rotor shaft 170 and other drive train components (e.g., gear box 230 and generator 240 shown in FIG. 6) are reduced. Therefore, this method is particularly useful in situations where yawing of the wind rotor is at least temporarily not possible, such as during a grid loss. For example, after adjusting the first and second pitch angles as described above, the wind rotor may be idling for the duration of the grid loss and the turbine is safeguarded against the adverse effects of vortex shedding.

As has been explained above, the vibration damping effect results from a considerable difference in pitch angles. Therefore, the first and second pitch angles may differ by at least 45 degrees. In particular, the damping effect in a specific direction is improved when the cross-sectional area of the rotor blades facing in this direction is enlarged. In other words, damping of vibrations in a specific direction is improved when the broad side of the blade faces this direction since the air drag of the blade will damp vibrations in this direction. In a situation without yawing capability, the blades are set to different pitch angles so that damping occurs under any circumstances, and in particular for varying wind direction.

Figure 3:
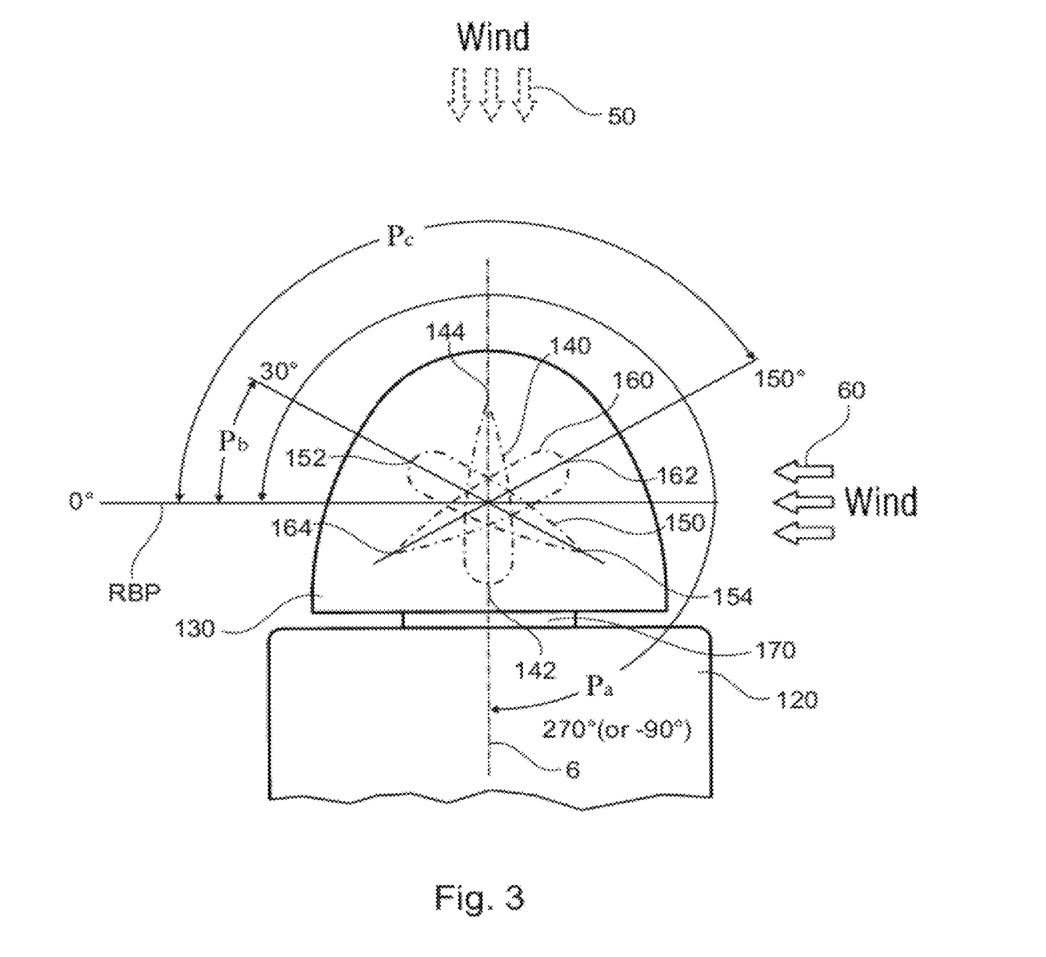
FIG. 3 is a superimposed top side view of the wind turbine shown in FIG. 1 with an adjustment of the rotor blade pitch angles according to an embodiment of the present invention.

Furthermore, a third rotor blade 160 may be part of the vibration-reducing concept described above. In one embodiment, the third pitch angle Pc of the third rotor blade 160 is adjusted such that Pc is considerably different from the first and second pitch angles Pa and Pb. For example, the third pitch angle Pc may differ from the first and second pitch angles Pa, Pb by at least 30 degrees, respectively. An exemplary embodiment of such an arrangement is shown in FIG. 3, which is a superimposed top side view of the wind turbine shown in FIG. 1. In the embodiment shown in FIG. 3, the first rotor blade 140 has a pitch angle Pa of −90 degrees, the second rotor blade 150 has a pitch angle of +30 degrees, and the third rotor blade 160 has a pitch angle Pc of +150 degrees. Accordingly, the angular difference between the first and second pitch angles Pa, Pb is 120 degrees when measured in clockwise direction, between the second and third pitch angles Pb, Pc is 120 degrees when measured in clockwise direction and between the first and third pitch angles Pa, Pc is 120 degrees when measured in clockwise direction. Of course, other values for the pitch angles and the angular differences therebetween may be chosen in accordance with the circumstances so that the positions have an angular difference that is either equivalent or not equivalent. In one embodiment, for example, the first pitch angle Pa is −90 degrees, the second pitch angle Pb is +45 degrees, and the third pitch angle Pc is zero degrees. In another embodiment, the first pitch angle Pa is +90 degrees, the second pitch angle Pb is −30 degrees, and the third pitch angle Pc is −150 degrees.

As mentioned above, some embodiments employ even larger angular differences than only 30 degrees in which the third pitch angle differs in clockwise direction from the first and second pitch angles by at least 45 degrees, respectively. Even larger differences may be used between the first, second and third pitch angles Pa, Pb, Pc, respectively, such as 60 degrees, 80 degrees, 90 degrees or 120 degrees. For example, the difference in clockwise direction between the first and second pitch angle Pa, Pb may in the range from 30 to 150 degrees, particularly 45 to 120 degrees, more particularly 60 to 90 degrees. In another embodiment, the difference in clockwise direction between the second and third pitch angles Pb, Pc is in the range from 30 to 120 degrees, particularly 45 to 105 degrees, and more particularly 60 to 90 degrees. Also, the difference in clockwise direction between the first and third pitch angles Pa, Pc is in the range from 60 to 270 degrees, particularly 90 to 240 degrees, more particularly 120 to 180 degrees in some embodiments. In some embodiments at least one of the pitch angles is in the range from 0 degrees up to, but not including, 180 degrees and at least one of the pitch angles is in the range from 180 degrees up to, but not including, 360 degrees. In other embodiments, one of the pitch angles is set to zero degrees.

Figure 4:
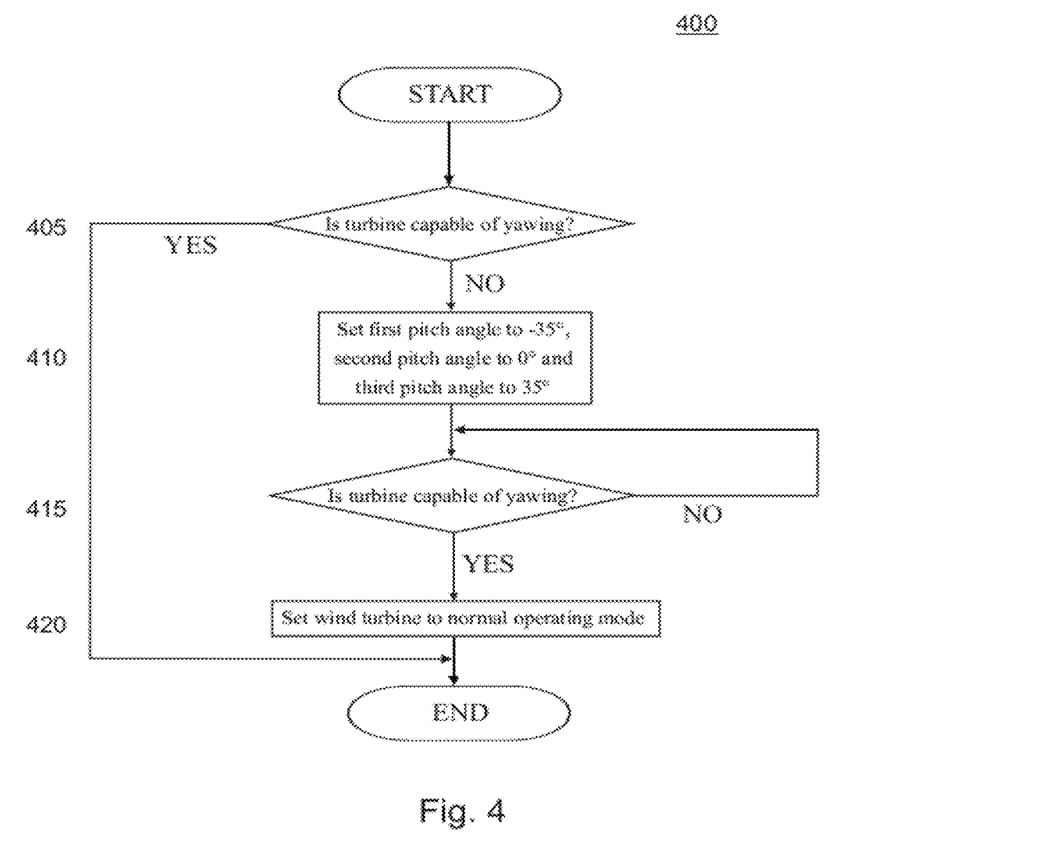
FIG. 4 is a flow diagram of a method according to an embodiment of the present invention.

A specific embodiment of a method 400 as described above is shown in the flow diagram of FIG. 4. Therein, the wind turbine is continuously monitored to determine whether yawing of the wind turbine is temporarily not possible at decision block 405. In the event grid loss or any other situation affecting the ability to yaw the wind turbine is detected, the method proceeds to adjust the pitch angles of the rotor blades and set them to −35 degrees, zero degrees, and +35 degrees in order to reduce vibrations, in particular fore-aft vibrations due to vortex shedding at block 410. The particular pitch angles are, however, only examples and different pitch angle values may be used. In a loop 415, it is monitored whether the grid loss condition still exists. As long as the inability to power the yaw drive exists, the setting of the pitch angles is maintained.

It should be understood that adjustment of the pitch angles and monitoring of the grid may be performed without power supply from the grid. Typically, wind turbines include an emergency power supply, such as batteries, accumulators, capacitors or the like, which enable pitching of the blades in situations where the grid is not available as a power supply. Thus, the described adjustment of the pitch angles may be effected by the emergency power supply. However, the emergency power supply has limited storage capacity and may be exhausted by repeatedly adjusting the pitch angles. Therefore, the pitch angles will typically be adjusted once to values that are optimized for varying wind conditions. With such a pitch angle setting, the turbine is in a safe state even for varying wind conditions. For example, such a safe setting may be the one shown in FIG. 3. Finally, the wind turbine resumes normal operation 420 once the wind turbine is able to yaw. Typically, bringing the wind turbine back to normal operation involves specific wake-up procedures.

In other embodiments in which yawing is not possible but the grid is available, e.g., a defect of the yawing system, the pitch angles may still be adjusted during the period of yaw-incapability without exhausting the emergency power supply. In such an event, a change in wind direction may render another pitch angle setting more preferable in view of vibration damping. Since the grid is available as a power supply for the pitch drive, the pitch angles may be adjusted to optimize vibration damping under the actual conditions. In the event of a damaged yaw system, normal operation of the wind turbine may only be resumed after repair or replacement of the yaw system. In such a scenario, normal operation will not be resumed but the method will include repair or replacement of the defective parts. Thereafter, the wind turbine will be restarted according to usual procedure.

As mentioned above, the pitch angle differences will be chosen to reduce the vibrations induced by vortex shedding and/or similar phenomena. Therefore, the results of different pitch angle combinations may be monitored over time and correlated with the respective wind conditions, in particular wind direction and wind speed, at the time the pitch angle combination was employed. Furthermore, vibration detectors may sense vibrations in different parts of the turbine, for example tower vibrations, rotor shaft vibrations or the like. Also, the vibration detectors may sense vibrations in different spatial directions, for example in two or three mutually orthogonal directions. The foregoing measures allow collection of data and establishing empiric relationships which may be applied for controlling the turbines in situations of yaw-incapability.

According to another aspect of the present invention, the wind rotor may be parked in a position in which none of the rotor blades is positioned in the vicinity of the tower 110 of the wind turbine 100. This includes positions in which the blade is in front of the tower, or behind the tower, or near the tower. In particular, vortex shedding may as well occur with the blade being in front or behind the tower with respect to wind direction. In the context of the present embodiment, the terms "parking" or "parked" refer to locking the wind rotor in such position in contrast to allow idling of the wind rotor. For example, the wind rotor may be locked in the desired position by applying a brake. The reason for parking the wind rotor in the described position is that the vortex-induced oscillations may be amplified when the rotor is parked with one blade in the vicinity of the tower, i.e. with one blade pointing down. This amplification of the oscillations may be due to a lower damping of the rotor blade being in the vicinity of the tower and/or an aerodynamical effect of the vortices on this blade. In this context, a rotor blade will typically be considered to be parked in the vicinity of the tower if its pitch axis is downward pointing and deviates from the tower axis within an angular range of −15 degrees to +15 degrees. In this context, upward and downward may be understood relative to the horizon or, stated otherwise, the upward direction is along the tower axis from tower base to nacelle whereas the downward direction is from nacelle to tower base. In order to avoid the aforementioned amplification of the oscillations, the wind rotor is parked in a position so that none of the blades is positioned in front of, behind or near the tower. In particular, upon detection of the situation where yawing of the wind rotor is not possible, the wind rotor is rotated about the rotor axis into a position in which none of the rotor blades is positioned in the vicinity of a tower of the wind turbine. Thus, the amplification can be avoided. In one embodiment, a wind rotor with three rotor blades is parked in a position in which one rotor blade is pointing upward and a pitch axis of the rotor blade forms an angle in the range of +15 degrees to −15 degrees, particularly +10 degrees to −10 degrees, more particularly +5 degrees to −5 degrees, with a longitudinal axis of the wind turbine tower. For example, such a situation is shown in FIG. 1 where rotor blade 140 is pointing upward and is aligned with the tower axis 115, i.e. the angle between the rotor blade pitch axis 146 and the tower axis is about zero degrees. Further to the above, when the wind rotor is locked, the pitch angle of the rotor blade closest to the tower may be adjusted in a way that it is less prone of picking up vortex-shedding excitation. For example, the pitch angle of the rotor blade closest to the tower may be adjusted such that the broad side of the rotor blade is substantially perpendicular to the actual and/or anticipated wind direction.

Furthermore, in situations where pitch angle adjustment is no longer enabled, positioning of the wind rotor such that none of the rotor blades is positioned in the vicinity of the tower may still be possible. Therefore, the described positioning of the wind rotor may be applied independent of the pitch angle setting and will still provide some reduction of the vibrations induced by vortex shedding.

Figure 5:
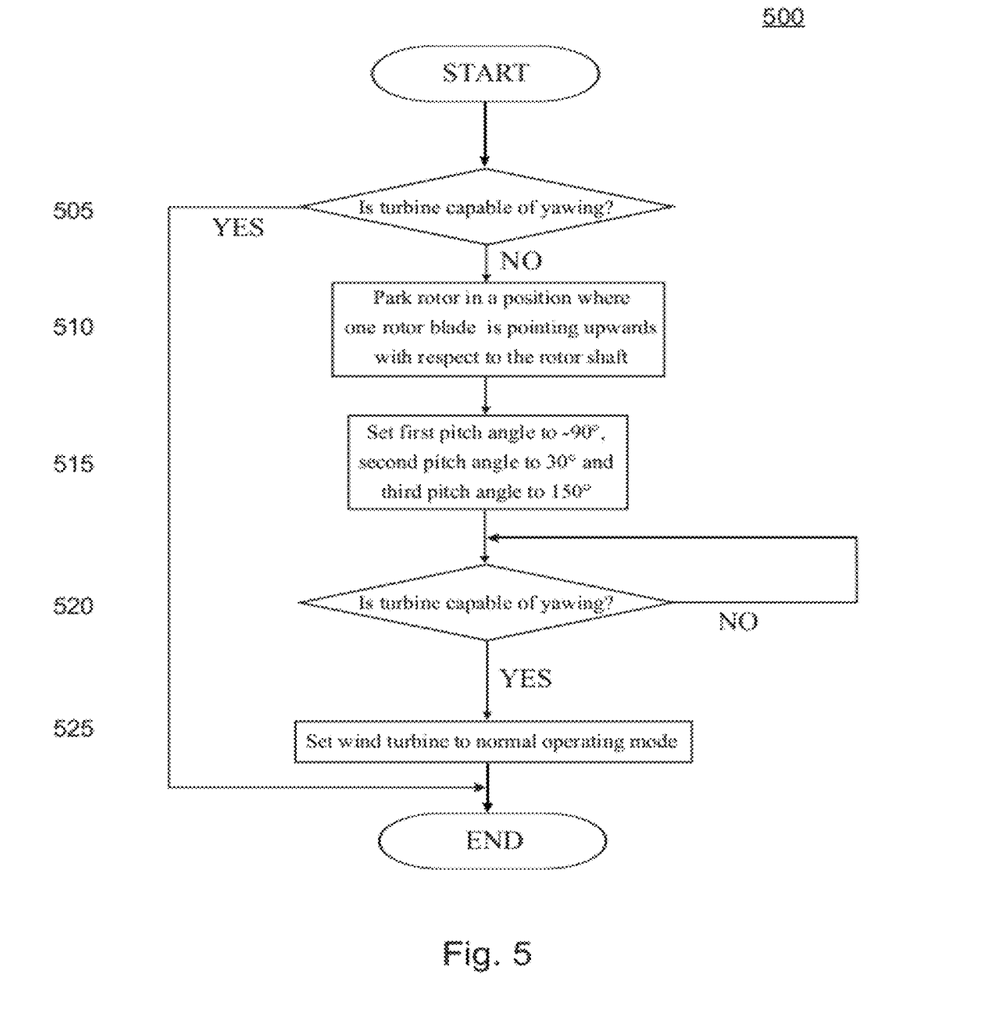
FIG. 5 is a flow diagram of a method according to another embodiment of the present invention.

FIG. 5 is a flow diagram of a method 500 according to a further embodiment of the method described above. Similar to FIG. 4, yawing capability of the wind turbine is continuously monitored at decision block 505. In the event grid loss or any other situation affecting yawing capability is detected, the method proceeds to park the wind rotor in a position in which one of the rotor blades points upward with respect to the rotor shaft in order to avoid amplification of induced vibrations in block 510. Subsequently, the first pitch angle is set to −90 degrees, the second pitch angle is set to 30 degrees, and the third pitch angle is set to 150 degrees in block 515 to further reduce vibrations. As described above, the adjustment of the pitch angles may be effected by the emergency power supply. Typically, the pitch angles will be adjusted only once to save energy of the emergency power supply. In a loop 520, it is monitored whether the condition still exists. As long as the inability for powering the yaw drive exists, the parking position of the wind rotor and the setting of the pitch angles are maintained. When the turbine detects that the grid is available again or the wind turbine is otherwise able to yaw again, normal operation of the turbine will be resumed at block 525. Typically, bringing the wind turbine back to normal operation involves specific wake-up procedures which may be executed.

In some embodiments of the method, the pitch angles of the first, second and third rotor blades differ by at least 45 degrees, respectively. In other embodiments, the vibrations are not only reduced in one spatial direction, e.g. the fore-aft direction, but are also reduced in at least one further direction orthogonal to the axial direction of the rotor shaft. In even further embodiments, the pitch angles of the rotor blades are set to values so that vibration damping occurs in three mutually orthogonal spatial directions. However, the foregoing types of vibrations are only non-limiting examples and the embodiments of the present invention relate in general to vibration reduction during events of yaw-incapability. Accordingly, the embodiments of the present invention may be applied to reduce vibrations of wind turbine components in general. Such wind turbine components include, but are not limited to, tower 110, nacelle 120, rotor hub, 130, rotor blades 140, 150, 160, rotor shaft 170, gear box 230, or generator 240. The vibration reduction is achieved by adjusting the pitch angles of the rotor blades as described herein in connection with the various embodiments of the present invention. Typically, the specific settings will be empirically obtained because they depend on the specific conditions at the wind farm site and the location of the turbine within the wind farm. As a basis for the empiric control strategy, at least one variable will be monitored. Typically, the variable will be a tower vibration, a fore-aft vibration of the wind rotor, a wind direction, a wind speed, a yaw angle offset, a rotor position or any combination thereof. Of course, other environmental or turbine parameters may also be monitored and correlated with the vibrational state of the turbine. Typically, the pitch angle setting of the first, second and third rotor blades will be based on the determined variable(s) in order to reduce vibration.

It should further be noted that rotation of the wind rotor about the rotor axis is allowed in any of the embodiments described above, with the only exception of embodiments in which the wind rotor is locked. In particular, the setting of the pitch angles is not constrained to such combinations in which rotation of the wind rotor is suppressed. To the contrary, slow rotation of the wind rotor may even be desired in order to avoid brinelling or other vibration-induced damage to the rotating machinery. It will be understood that the basic concepts underlying the present application are applicable to both locked wind rotors and idling wind rotors.

Figure 6:
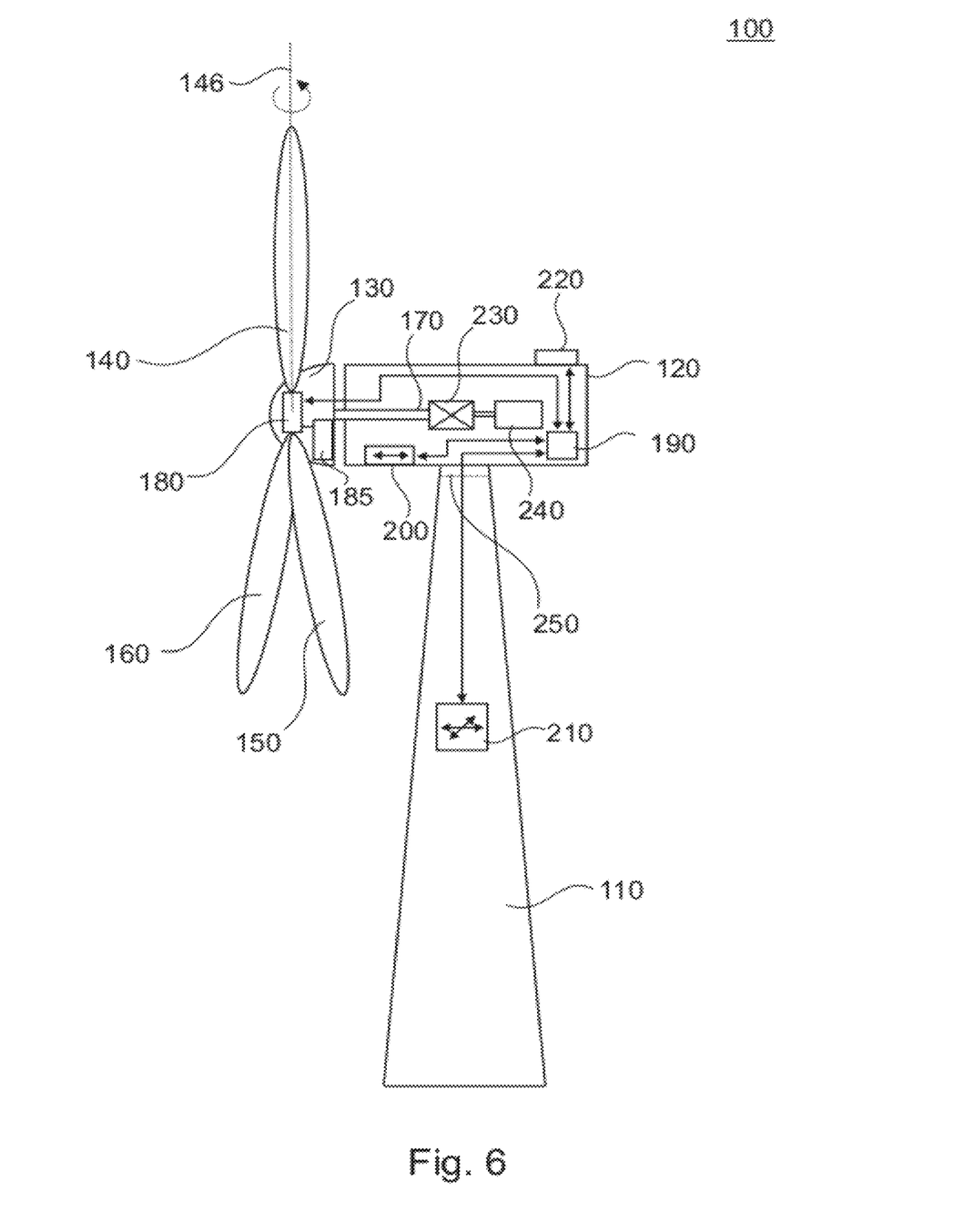
FIG. 6 is a side view of a wind turbine according to an embodiment of the present invention; and, FIG. 7 is a flow diagram of a method according to still another embodiment of the present invention.

FIG. 6 is a side view of a wind turbine 100 according to an embodiment of the present invention. Wind turbine 100 has first, second and third rotor blades 140, 150, 160 which are mounted to rotor hub 130. As indicated in FIG. 6, each of the rotor blades is rotatable about a pitch axis, e.g., axis 146 for rotor blade 140, for adjustment of its respective pitch angle. The wind turbine further includes a pitch drive system 180 which is adapted to adjust the pitch angles of each rotor blade 140, 150, 160. For example, pitch drive system 180 may include electric servomotors located at each of the rotor blades so that independent pitch angle adjustment of each rotor blade is allowed. In addition, an emergency power supply 185, e.g. a battery pack, accumulators or capacitors, are located within hub 130. Emergency power supply 185 is connected with pitch drive system 180 and adapted to supply the pitch drive system with power in the event power supply from the grid is not available. Furthermore, wind turbine 100 includes a wind turbine controller 190. Typically, wind turbine controller 190 is a specifically adapted computer system that is connected to one or more sensors. Thus, wind turbine controller 190 may continuously monitor the environmental condition in the vicinity of the wind turbine and the condition of the wind turbine. On the basis of these data, wind turbine controller 190 then determines whether any turbine parameters, e.g. pitch angles, yaw angle, generator torque, should be adjusted. If turbine parameters are to be adjusted, the wind turbine controller sends control signals to actuators which then adjust the turbine parameters accordingly. In the embodiment shown in FIG. 6, wind turbine controller 190 is connected to a first vibration detector 200 which is adapted to detect vibrations in a fore-aft direction of the nacelle 120. Additionally or alternatively, first vibration detector 200 may be adapted to detect lateral vibrations of the nacelle 120. For example, vibration detector 200 may be directly mounted to a main frame or a wall of nacelle 120. In other embodiments, vibration detector 200 may be mounted to rotor hub 130. Also, vibration detector 200 may be adapted to detect vibrations in other spatial directions, for example in the direction of the tower axis. In other embodiments, bending moments acting on rotor shaft 170, the blades 140, 150, 160, the hub 130, the main frame or the tower walls may be detected by the use of strain gauges. Furthermore, wind turbine controller 190 is connected to a further vibration sensor 210 located in tower 110. Vibration sensor 210 is adapted to detect tower vibrations in mutually orthogonal spatial directions, typically vibrations in directions orthogonal to the tower axis, and to report the detected vibrations to controller 190. In general, wind turbine controller 190 is connected to at least one vibration detector adapted to sense the vibrations of at least one wind turbine component. The wind turbine components include, but are not limited to, tower 110, nacelle 120, rotor hub, 130, rotor blades 140, 150, 160, rotor shaft 170, gear box 230, or generator 240. Thus, controller 190 has an overview of the vibrational state of the wind turbine and may determine detrimental vibrations such as fore-aft vibrations that may harm turbine components such as rotor shaft 170, gear box 230 and generator 240. Furthermore, controller 190 is connected to a wind sensor 220 which is adapted to detect wind direction and wind speed. For example, wind sensor 220 may include an anemometer and a wind vane. Thus, the vibrational state of the turbine can be correlated to the wind data collected by controller 190 either by controller 190 itself or in a control center to which the data are reported. Furthermore, the position of the wind rotor, i.e. the orientation of the rotor blades 140, 150, 160 with respect to the rotor axis 6, may be used as an input parameter for the control strategy of wind turbine controller 190. Based on these data, an empiric control strategy, i.e. specific pitch angle settings for specific wind conditions, may be determined and implemented in wind turbine controller 190. Thus, controller 190 may adjust the pitch angles of the rotor blades according to the empiric control strategy depending on the wind conditions detected by wind sensor 220. Furthermore, self-learning algorithms may be implemented in controller 190 so that the pitch angle settings are optimized for the current wind conditions during situations in which yawing is at least temporarily not possible but pitch angle adjustment is still possible, e.g. when the yaw system is out of order but the grid is available.

Figure 7:
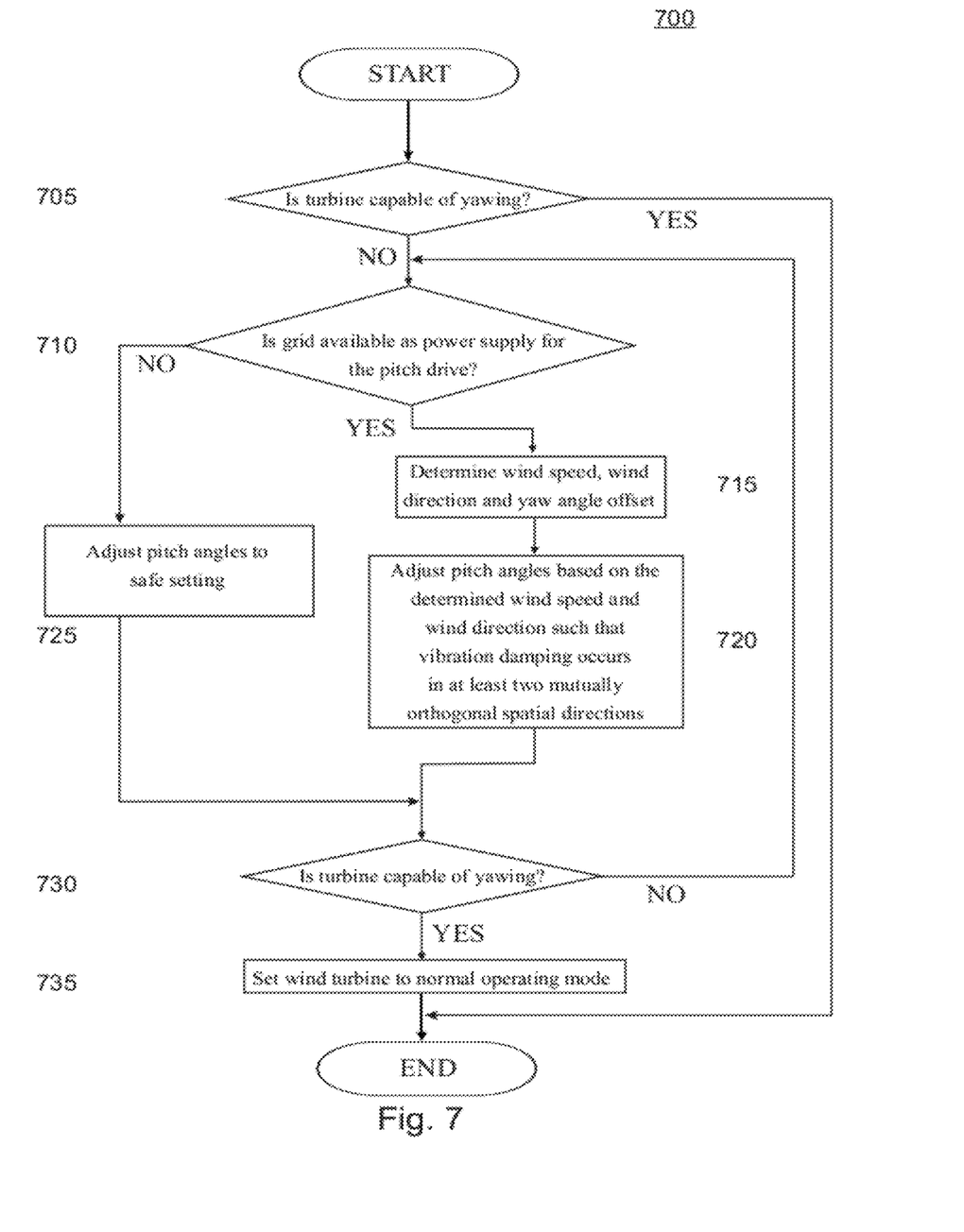

FIG. 7 is a flow diagram of a method 700 as it may be performed by a wind turbine as shown in FIG. 6. Therein, yawing of the wind turbine is continuously monitored at decision block 705. Thereafter, it is determined whether the grid is still available as a power supply for the pitch drive at decision block 710. In the event the grid is still available, the method proceeds, at block 715, to determine wind speed, wind direction and yaw angle offset, i.e. the misalignment between the wind direction and the rotor blade plane. Based on the values of the variables determined, the pitch angles are set to values that reduce vibrations in at least two mutually orthogonal spatial directions at block 720. Thus, vibration damping is improved for the actual environmental conditions. In some embodiments, the pitch angles are adjusted to reduce vibrations not only in two but also in three mutually orthogonal spatial directions. Thus, vibration damping is enhanced. As shown in FIG. 7, an alternative procedure is applied if it is determined at decision block 710 that the grid is not available in this event, the method proceeds with adjusting the pitch angles of the blades to a safe setting at block 725. A safe setting would be a combination of pitch angles that are adapted for damping vibrations regardless of the wind direction. Such a setting may, for example, be the setting shown in FIG. 3. Since the grid is not available during this operation, the pitch angle adjustment is typically made by the emergency power supply. In order to avoid exhaustion of the emergency power supply, the pitch angles are only adjusted once, namely to the safe setting, and then not altered during the grid loss. Subsequently, the capability of yawing the wind turbine is monitored to determine whether the yaw-incapability of the turbine still exists at decision block 730 in either case. If yawing is still not possible, the method returns to decision block 710 and proceeds from thereon as described above. If it is detected in decision block 730 that the turbine is again capable of yawing, the wind turbine resumes normal operation according to block 735, which typically involves executing specific wake-up procedures as described above.

Some of the embodiments described herein were exemplified by reference to three-bladed wind turbines. However, the embodiments of the present invention may be practiced and implemented also in wind turbines having a different number of blades, in particular in wind turbines having only two blades as well as in wind turbines having four or more blades.

This written description uses examples, including the best mode, to enable any person skilled in the art to make and use the described subject matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reducing vibrations of a wind turbine, the wind turbine comprising a wind rotor comprising at least a first rotor blade and a second rotor blade, the method comprising:
    adjusting a first pitch angle of the first rotor blade and a second pitch angle of the second rotor blade so that the first and second pitch angles differ by at least 30 degrees, wherein the adjusting occurs when the wind turbine is in a state where yawing of the wind rotor is not possible and the wind rotor remains in a fixed yaw position throughout the adjusting.

2. The method according to claim 1, wherein the state of the wind turbine where yawing of the wind rotor is not possible is effectuated by a grid loss.

3. The method according to claim 1, wherein the state of the wind turbine where yawing of the wind rotor is not possible is effectuated when a yaw system of the wind turbine is out of function.

4. The method according to claim 1, wherein the first and second pitch angles differ by at least 45 degrees.

5. The method according to claim 1, wherein the wind rotor further comprises a third rotor blade and the method further comprises:
    adjusting a third pitch angle of said third rotor blade such that the third pitch angle differs from the first and second pitch angles by at least 30 degrees, respectively, wherein the adjusting occurs when the wind turbine is in a state where yawing of the wind rotor is not possible and the wind rotor remains in a fixed yaw position throughout the adjusting.

6. The method according to claim 5, wherein the third pitch angle differs from the first and second pitch angles by at least 45 degrees, respectively.

7. The method according to claim 5, wherein at least one of the pitch angles is in the range from 0 degrees up to, but not including, 180 degrees and at least one of the pitch angles is in the range from 180 degrees up to, but not including, 360 degrees.

8. The method according to claim 5, wherein at least one of the pitch angles is zero degrees.

9. The method according to claim 5, wherein the difference in clockwise direction between the first and second pitch angle is in the range from 30 to 150 degrees, the difference in clockwise direction between the second and third pitch angle is in the range from 30 to 120 degrees and the difference in clockwise direction between the first and third pitch angle is in the range from 60 to 270 degrees.

10. The method according to claim 5, wherein the pitch angles of the first, second, and third rotor blades differ by at least 45 degrees, respectively.

11. The method according to claim 1, wherein, upon detection of the state where yawing of the wind rotor is not possible, the wind rotor is parked in a position where none of the rotor blades are positioned in the vicinity of a tower of the wind turbine.

12. The method according to claim 11, wherein one rotor blade is pointing downwards and a pitch axis of said rotor blade forms an angle in the range of more than 15 degrees with a longitudinal axis of the wind turbine tower.

13. The method according to claim 1, further comprising:
    parking the wind rotor in a position wherein each of the rotor blades forms an angle of at least 15 degrees with an axis of a wind turbine tower.

14. The method according to claim 13, wherein the wind rotor is locked in said position when the wind turbine is in a state where yawing of the wind rotor is not possible and the wind rotor remains in a fixed yaw position.

15. The method according to claim 1, further comprising: determination of at least one variable selected from the group consisting of a tower vibration, a fore-aft vibration of the wind rotor, a wind direction, a wind speed, a yaw angle offset, a rotor position, and any combination thereof; and
   adjusting the pitch angles of the first and second rotor blades based on the at least one determined variable.

16. The method according to claim 1, wherein the pitch angles of the rotor blades are set to values so that vibration damping occurs in at least two mutually orthogonal spatial directions.

17. A wind turbine comprising:
   a wind rotor comprising at least a first rotor blade and a second rotor blade, each of the rotor blades being rotatable about a pitch axis for adjustment of its respective pitch angle;
   a pitch drive system configured to adjust the pitch angles of each rotor blade; and
   a wind turbine controller configured to control the pitch drive system to make pitch angle adjustments including to adjust a first pitch angle of the first rotor blade and a second pitch angle of the second rotor blade so that the first and second pitch angles differ by at least 30 degrees when the wind turbine is in a state where yawing of the wind rotor is not possible and the wind rotor remains in a fixed yaw position throughout the pitch angle adjustments.

18. The wind turbine according to claim 17, wherein the wind rotor further comprises a third rotor blade mounted to a rotor hub and being rotatable about a pitch axis for adjustment of its pitch angle by the pitch drive system, and
   wherein the wind turbine controller is further configured to adjust, a third pitch angle of the third rotor blade such that the first, second, and third pitch angles differ by at least 30 degrees, respectively, when the wind turbine is in a state where yawing of the wind rotor is not possible and the wind rotor remains in a fixed yaw position throughout the pitch angle adjustments.

19. The wind turbine according to claim 17, further comprising:
   a vibration detector configured to detect vibrations of at least one wind turbine component, wherein the wind turbine controller is further configured to adjust the first and second pitch angles based on the detected vibrations such that the vibrations of the wind turbine component are reduced.

* * * * *

UNITED STATES PATENT AND TRADEMARK OFFICE
CERTIFICATE OF CORRECTION

PATENT NO. : 8,360,723 B2
APPLICATION NO. : 12/570396
DATED : January 29, 2013
INVENTOR(S) : Bart Veldkamp et al.

It is certified that error appears in the above-identified patent and that said Letters Patent is hereby corrected as shown below:

Title Page, Item (75), under "Inventors", in Column 1, Line 3,
delete "Zwelle" and insert -- Zwolle --, therefor.

In the Specifications:

In Column 9, Lines 29-30, delete "available in" and insert -- available. In --, therefor.

Signed and Sealed this
Eleventh Day of June, 2013

Teresa Stanek Rea
*Acting Director of the United States Patent and Trademark Office*